(12) United States Patent
Janssen, Jr. et al.

(10) Patent No.: US 9,020,950 B2
(45) Date of Patent: Apr. 28, 2015

(54) SYSTEM AND METHOD FOR GENERATING, UPDATING, AND USING MEANINGFUL TAGS

(75) Inventors: William C. Janssen, Jr., Mountain View, CA (US); Lauri J. Karttunen, Emerald Hills, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 203 days.

(21) Appl. No.: 13/330,488

(22) Filed: Dec. 19, 2011

(65) Prior Publication Data
US 2013/0159306 A1    Jun. 20, 2013

(51) Int. Cl.
*G06F 7/00* (2006.01)
*G06F 17/30* (2006.01)

(52) U.S. Cl.
CPC .... *G06F 17/30734* (2013.01); *G06F 17/30737* (2013.01)

(58) Field of Classification Search
CPC .................................................. G06F 17/30737
USPC ........................... 707/742, 796, 772; 715/260
See application file for complete search history.

(56) References Cited

U.S. PATENT DOCUMENTS

| | | | | |
|---|---|---|---|---|
| 7,856,597 | B2 * | 12/2010 | Stuhec | 715/255 |
| 8,117,242 | B1 * | 2/2012 | Zilka | 707/822 |
| 2003/0069880 | A1 * | 4/2003 | Harrison et al. | 707/3 |
| 2004/0139064 | A1 * | 7/2004 | Chevallier et al. | 707/3 |
| 2004/0205671 | A1 * | 10/2004 | Sukehiro et al. | 715/532 |
| 2007/0016575 | A1 * | 1/2007 | Hurst-Hiller et al. | 707/5 |
| 2009/0281970 | A1 * | 11/2009 | Mika et al. | 706/12 |
| 2009/0292686 | A1 * | 11/2009 | Carter et al. | 707/5 |

OTHER PUBLICATIONS

Braun et al. Ontology Maturing: a Collaborative Web 2.0 Approach to Ontology Engineering. 2007. In: Proceedings of the Workshop on Social and Collaborative Construction of Structured Knowledge at the 16th International World Wide Web Conference (WWW 07), Banff, Canada.*

Muir, David. "Del.icio.us Delightful De-lovely!: Online Social Bookmarking, or: Tagging for Teaching" [online], Apr. 4, 2004, [archived at archive.org on Nov. 7, 2005]. Retrieved from the Internet<URL: http://replay.waybackmachine.org/20051107024448/http://personal.strath.ac.uk/d.d.muir/Delicious_Guide.pdf>, 9 pages.*

* cited by examiner

*Primary Examiner* — James E Richardson
(74) *Attorney, Agent, or Firm* — Patrick J. S. Inouye; Krista A. Wittman

(57) ABSTRACT

A system and method for generating tag glossaries and use thereof is provided. A set of tags is accessed. Each tag is associated with a glossary that includes one or more terms and definitions for the terms. A new tag is generated and a new glossary is generated for the new tag based on the glossaries associated with the set of tags. The tag glossaries can be used to provide context for documents associated with the tags, to determine appropriate tags for untagged documents, to help in search for other documents, and to build indices for documents or collections of documents.

19 Claims, 7 Drawing Sheets

| | | |
|---|---|---|
| 41 — GLOSSARY FOR "eBOOKS" — 48 | | |
| 42 { RE-SCAN DOCUMENTS IN CATEGORY "eBOOKS": (RE-DO INDEXING) — 45<br>SHOW EDITABLE VERSION: (EDIT)<br>LOOK FOR MISSING DOCUMENTS: (FIND) | | |
| 43 — ACROBAT<br>45 — (ALSO "ADOBE ACROBAT") | ADOBE'S SOFTWARE SUITE FOR WORKING WITH PDF FORMAT. — 44 | |
| ACROBAT eBOOK READER<br>(ALSO "ADOBE ACROBAT eBOOK READER") | ORIGINALLY GLASSBOOK READER, THIS IS AN eBOOK READER FOR DOCUMENTS IN ADOBE PDF FORMAT. | |
| 46 — CLEARTYPE | MICROSOFT'S VERSION OF SUB-PIXEL FONT RENDERING. (SEE SUB-PIXEL FONT RENDERING). — 47 | |
| COOLTYPE | ADOBE'S VERSION OF SUB-PIXEL FONT RENDERING. (SEE SUB-PIXEL FONT RENDERING). | |
| DIGITAL OBJECT IDENTIFIER (ALSO "DOI") | THE DIGITAL OBJECT IDENTIFIER (DOI) IS AN IDENTIFICATION SYSTEM FOR INTELLECTUAL PROPERTY IN THE DIGITAL ENVIRONMENT. | |
| DIGITAL RIGHTS MANAGEMENT (ALSO "DKM") | DIGITAL RIGHTS MANAGEMENT (DRM) COVERS THE DESCRIPTION, IDENTIFICATION, TRADING, PROTECTION, MONITORING AND TRACKING OF ALL FORMS OF RIGHTS USAGES OVER TANGIBLE AND INTANGIBLE ASSETS. | |
| eBOOKMAN | A HANDHELD DEVICE DESIGNED FOR READING eBOOKS AND LISTENING TO AUDIO BOOKS. | |
| EBX (ALSO "ELECTRONIC BOOK EXCHANGE") | THE EBX WORKING GROUP WAS DEVELOPED TO CREATE A STANDARD (EBX) FOR PROTECTING COPYRIGHT IN ELECTRONIC BOOKS AND FOR DISTRIBUTING ELECTRONIC BOOKS. | |

FIG. 3

SYSTEM AND METHOD FOR GENERATING, UPDATING, AND USING MEANINGFUL TAGS

FIELD

This application relates in general to document tagging, and in particular, to a system and method for associating glossaries with tags, and use thereof.

BACKGROUND

The act of "tagging" has greatly increased due to the increase in social networking and use of desktop software. During tagging, a user assigns a tag, such as a word or phrase, to a document, image, or Web page to "mark" the item with an identifying concept. For example, in social networking, users commonly post and tag photographs of themselves and friends using a tag as an identifier for the people in the picture, such as by name, nickname, or user name. The tag provides metadata for the marked item and once assigned, can be used for quickly determining a topic of the document or for identification and retrieval, such as through search queries based on the tag.

However, conventional tags are sparsely defined, coarse, and ambiguous. Currently, conventional tagging systems are unable to effectively and efficiently distinguish between homonyms, which have different meanings for the same tag, or combine synonyms, which include multiple tags for the same concept. For example, a tag with the word "java" can refer to coffee, an island, or programming language. Without further information, a user or tagging system is unable to determine the meaning of the tag.

Further, the assignment of tags is usually subjectively determined by a user, which can result in an assigned tag that may not accurately reflect a topic of a document or that is not understandable by other users. For instance, a user marks a picture of a baby with a tag that provides the name of the baby's mother. The user knows that the tagged person is the mother; however, another user may believe that the tag refers to the baby. In another example, a user assigns a tag "Section IV-Research" to a document regarding sickle cell anemia. The user assigns the particular tag because he is working on a paper about genetic disorders and wants to identify the section of the paper that will cite the document. However, the tag is likely to be misunderstood or confusing to another user. Therefore, conventional tags are limited in use and may only be beneficial for the creator of the tags.

Thus, a system and method for providing context for a tag, such that similar tags can be distinguished, is needed. Preferably, the tags are refined without requiring retagging of documents.

SUMMARY

Glossaries of terms associated with tags provide a context for the tags assigned to a document. The glossaries of one or more of the tags can be used to automatically tag other documents, augment search queries, or create an index for the document. The terms defined in the glossary can be used themselves as tags to identify sub-topics of the main tag.

An embodiment provides a system and method for generating tag glossaries and use thereof. A plurality of documents is accessed. Each document is associated with one or more tags. Each tag may then be associated with a glossary, wherein each glossary comprises one or more terms, definitions for the terms, and possible synonyms or aliases for each term. When a new tag is assigned to an untagged document, a new, empty glossary is generated for the new tag. Those tagged documents that are similar to the untagged document may be identified, and one or more terms from one or more of the glossaries associated with the tags of the similar documents are selected. The user may add additional tags, either from existing glossaries attached to other tags, or de novo. The selected terms and associated definitions are compiled as the new glossary.

A further embodiment provides a method for automatically tagging documents. A set of documents tagged with one or more tags is identified. Each tag is associated with a glossary of terms and definitions. Untagged documents are obtained and compared with the glossaries of the tagged documents. A similarity between at least one of the untagged documents and each of the glossaries of the tags of the tagged documents is identified. The tag associated with the tag glossary having the highest similarity with the untagged document is assigned to that untagged document.

A still further embodiment provides a method for augmenting a search query using a term glossary to reduce false positives in the search results. A query of one or more search terms is received. A database of tagged documents is accessed. Each tagged document is associated with a tag and a glossary for the tag. The glossary includes one or more terms relevant to the tag, definitions for the terms, and aliases for the terms. The search query is compared to the glossaries and one or more terms or aliases in at least one of the glossaries is selected for inclusion in the query.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a block diagram showing, by way of example, a tag glossary.

DETAILED DESCRIPTION

With the increase in computer use and social networking, document tagging has also increased. Document tagging allows users to assign tags to documents, such as books, articles, pictures, and Web pages for describing a topic or other aspects of the document and for identifying the document during a search. Hereinafter, the terms "document" and "Web page" are used interchangeably with the same intended meaning, unless otherwise indicated. However, tags provide minimal amounts of information and can be coarse and ambiguous. Many tagging systems are unable to understand and resolve the ambiguity to determine a meaning of the assigned tags, which limits the support and analysis that can be provided by the system. Tag glossaries provide a context for the tag from which a user or tagging system can distinguish the meanings of multiple tags.

Figure 1:
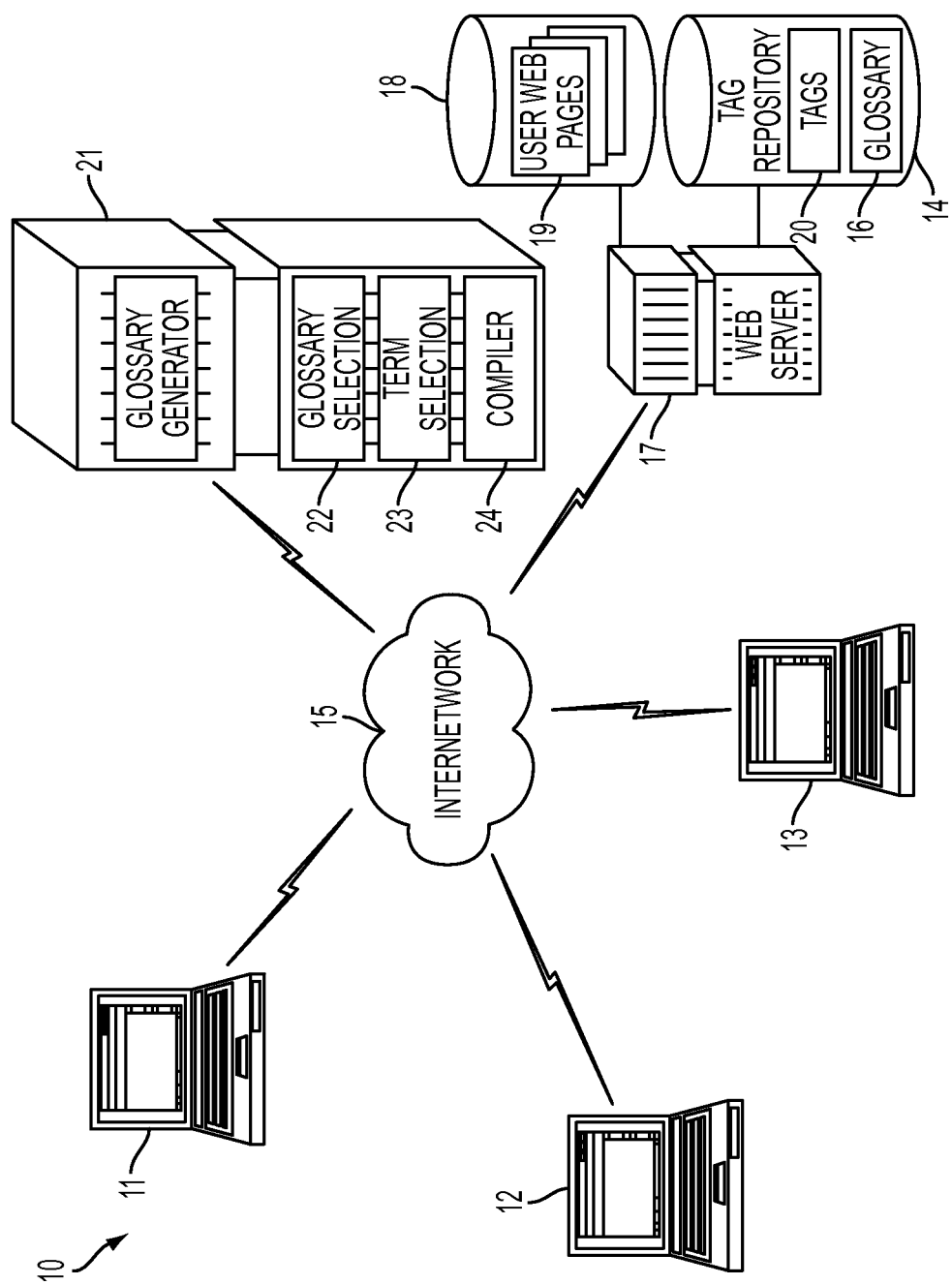
FIG. 1 is a system for generating tag glossaries and use thereof, in accordance with one embodiment.

A tag represents a topic and the associated glossary provides a context for the topic. Specifically, the glossary includes terms relevant to the at least one of the tags, definitions for the terms, and aliases for the terms. FIG. 1 is a system for generating, updating, and utilizing tag glossaries, in accordance with one embodiment. One or more user devices 11-13 are connected to a Web server 17 via an Internetwork 15, such as the Internet. The user devices 11-13 can include a computer, laptop, or mobile device, such as a cellular telephone or personal digital assistant. In general, each user device 11-13 is a Web-enabled device that executes a Web browser, which supports interfacing tools and information exchange with the Web server 17.

The Web server 17 is interconnected to a Web page database 18 and a tag repository 14. The Web page database 18 stores Web pages 19, which are provided to the user devices 11-13 upon request. The tag repository 14 stores metadata tags 20 associated with the Web pages 19. The tag repository 14 also stores glossaries 16, which are associated with the metadata tags 20. Other types of data and metadata are possible. The glossaries each include terms, term definitions, and aliases of the terms. In a further embodiment, the tags and glossaries can be stored locally on the user devices 11-13, along with documents, such as books, articles, pictures, and Web pages.

A user tags a document displayed on a Web page, which was obtained from the Web page database 18 via the Web server 17. If the tag is not associated with a glossary, a new glossary can be generated by adding terms, definitions, and aliases associated with the tag. A glossary generator 21 is interconnected to the user devices 11-13 and the Web server 17 via the internetwork 15, and includes a glossary selection module 22, term selection module 23, and compiler 24.

A new glossary can also be attached to a tag by inheriting the glossary entries of one or more pre-existing tags, perhaps belonging to the same user, or one or more other users. The glossary entries can include the terms of the glossary and the definitions and aliases associated with the terms. The user defining the new glossary can modify or update the inherited glossary entries by adding, deleting, and editing terms, as well as "overriding" the existing definition or alias of a term with a new definition or alias for the new glossary. The user can also add new terms and aliases to the glossary that are not present in the glossaries from which the new glossary inherits.

For example, the glossary selection module 22 optionally selects a preexisting glossary for use as a template for the new glossary. The preexisting glossary can be associated with the same tag as or a different tag than the newly-assigned tag. The term selection module 23 selects terms for inclusion in the glossary. The terms can be selected from sources, including the tag repository 14 and user devices 11-13, as well as other sources. Additionally, a user can manually add terms to the glossary. Each term can be preexisting, such as from a pre-existing glossary or newly generated. The terms can also be modified or removed, and new terms can be added. Additionally, the definition and aliases for each term can also be added to, edited, or replaced entirely. The compiler 24 compiles the selected terms and associated definitions and aliases into the new glossary, which is then associated with the newly-assigned tag. Once generated, glossaries can be used for automatic tagging of untagged documents, search query augmentation, and index generation, which are described below in detail with respect to FIGS. 4-7.

The user devices 11-13, glossary generator 21, and Web server 17 each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the user devices, are possible.

Further, the user devices 11-13, glossary generator 21, and Web server 17 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Associating Glossaries with Tags

Glossaries provide a context for content tags and assist users and tagging systems by providing a set of terms and definitions for those terms which help to establish the context for the tag, thereby resolving ambiguity in a user-appropriate fashion. For example, a user who is researching colleges can tag all Websites and documents reviewed with a tag titled "college." The glossary can include a term representative of each of the colleges, such as a name, that the user is interested in attending, as well as aliases for the college and a brief description of the college, such as location and requirements for admission. Alternatively, the user can tag each Website with a tag for a specific college, such as University of Washington, Washington State University, and Eastern Washington University. The terms in the glossary for each of the respective tags can include academic information, such as majors, sports teams, and dorms. Once generated or inherited, the glossary can be maintained, updated, and utilized to provide a context for the tag.

Figure 2:
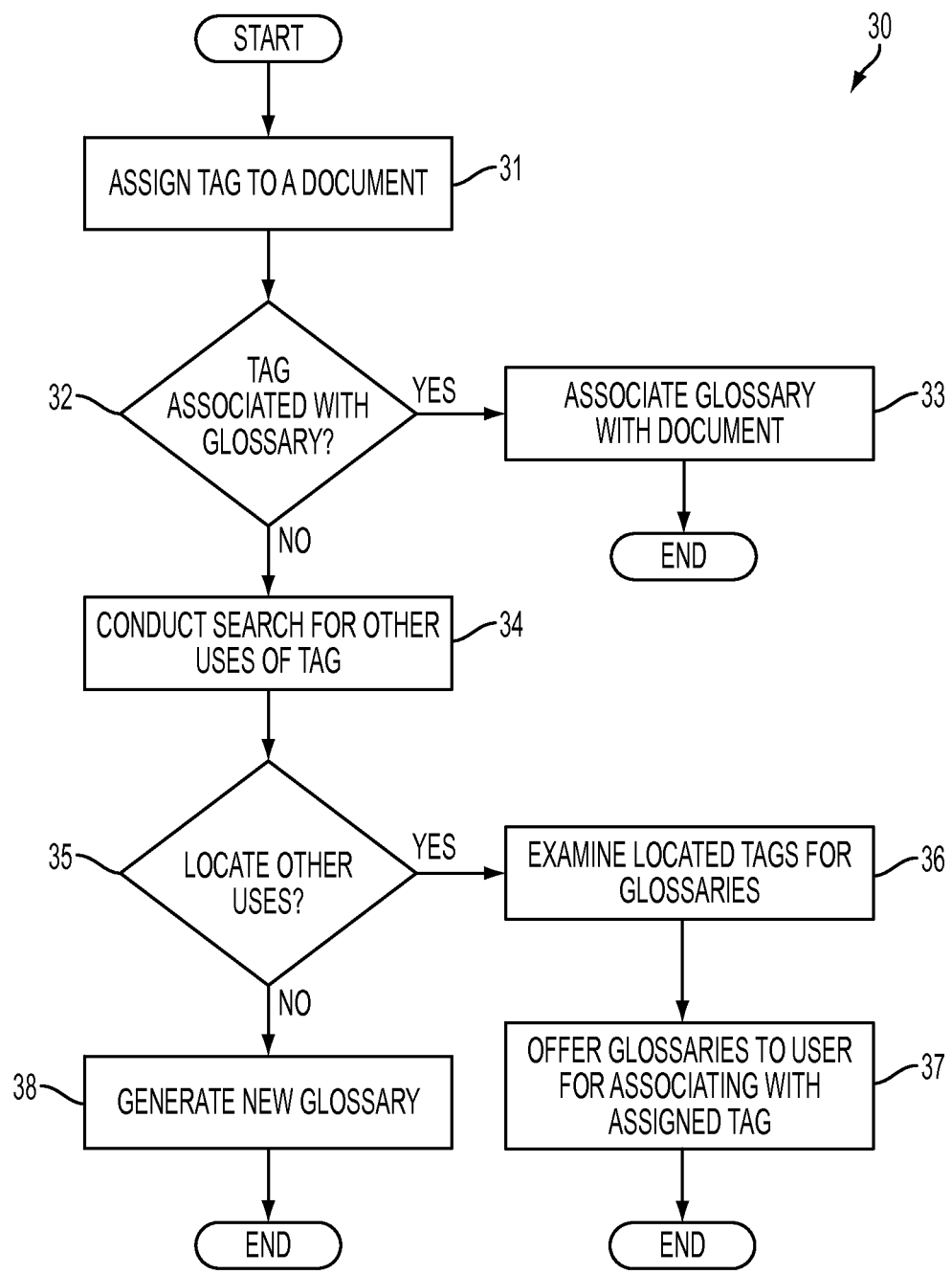
FIG. 2 is a flow diagram showing a method for generating tag glossaries, in accordance with one embodiment.

Additionally, the glossary terms can be used to select more precise tags for a document. For instance, returning to the above example, the user becomes interested in Stanford University and assigns a Website a tag titled "Stanford." If the tag is a term selected from the glossary associated with the tag "college," the glossary is automatically associated with the tag "college," as well as the tag "Stanford." However, if the tag "Stanford" is not selected from or included in the "college" glossary, but the "college" tag is applied independently to the same Website, an entry for Stanford University can be generated in the glossary for colleges. FIG. 2 is a flow diagram showing a method for generating glossaries via inheritance, in accordance with one embodiment. Tag inheritance allows a tag to inherit or exclude terms and definitions from one or more glossaries. A new tag is assigned to an untagged document (block 31). The tag can be assigned manually by a user or automatically by a tagging system. The tag is typically a keyword or phrase that is used to describe the corresponding document and help facilitate document searches. Other types of tags are possible, including images and colors. A determination is made as to whether the tag is associated with a glossary (block 32). For example, the user may already have created or associated a glossary with the tag in a prior use of the same tag for a different document. If so, the glossary attached to the tag is automatically associated with the tagged document (block 33). In a further example, a determination can be made as to whether the tag term is included in the glossary. If the tag is included as a term or alias in the glossary, that glossary is automatically associated with the document marked with the tag.

If the tag is not associated with a glossary, a search for other uses of the same tag, such as by other users, can be made (block 34). If other uses of the tag are located (block 35), those tags can be examined for attached glossaries (block 36). If found, those glossaries associated with the located tags can be offered to the user for building the new glossary for his personal use of the tag (block 37). If no other uses of the tag are identified, a new glossary can be generated (block 38), such as by inheriting a template of an existing glossary and adding terms, definitions, and aliases.

Terms, definitions, and aliases of the inherited glossaries, such as a glossary already associated with the tag or a glossary associated with a similar or related tag, can be added, modified, or removed to suit the user's needs. In one embodiment, upon adding a new term to the glossary, an automatic search is conducted for potential definitions. The potential definitions can be selected from dictionaries, papers, documents, and other glossaries. The potential definitions are then presented to the user who can select one of the definitions or choose to enter a newly-defined definition. Alternatively, the definition can be automatically selected by the tagging system. Also, portions of one or more definitions can be used to generate a new definition for the term.

In a further embodiment, a glossary can be generated by selecting one or more terms from glossaries associated with one or more tagged documents, without first selecting a glossary template, and compiling the selected terms. Modification of the terms, such as by adding, removing, replacing, or changing the terms, definitions, and aliases can occur, as requested by a user.

In yet a further embodiment, a user can manually create the glossary. The user selects one or more teems for inclusion in the glossary. Next, the user can identify aliases for the one or more of the terms. Finally, the user can provide definitions for the terms. The terms, definitions, and aliases are compiled to form the glossary.

In a still further embodiment, a glossary can be generated using an existing index associated with a tagged document. An index includes words or terms, known as headers, and pointers for the headers. The pointers identify the location of information in a document that relates to the header. To generate the glossary, the terms are selected from the index and pointers associated with the index terms, such as page numbers and other locators, are removed. A definition is provided automatically or manually by the user for each index term. The definitions can be newly-generated, copied, or modified from another glossary. One or more aliases for the terms can be determined and compiled with the index terms and definitions to form the glossary.

A glossary includes information related to the tag, which can provide a context for understanding the meaning of the tag. FIG. 3 is a block diagram showing, by way of example, a tag glossary 40. The glossary 40 can include a title box 45, a list of terms 46, and a list of definitions 47 that are associated with the terms. The title box 45 includes identification 41 of the tag 48 associated with the glossary 40 and user selectable options 42 for rescanning documents in a category of documents, displaying an editable version of the glossary, and searching for documents that are missing from the category. Other user selectable options and displays of the glossary are possible.

The list of terms 46 includes terms 43, such as words or phrases that are commonly used in discussion of the document to which the tag refers, and aliases 45 for the terms. The aliases 45 can be an alternative reference for a term, such as nickname for, abbreviation of, or initials for the term 43. In one embodiment, the aliases can be listed as a separate terms in the list with their own definitions and aliases. A specific number of terms 43 can be included in a glossary 40 or alternatively, an unspecified number of terms can be included. The list of definitions 47 includes at least one definition 44 for each term 43 in the list. Each definition 44 can include a textual description of the term 43, such as use, purpose, location, and manufacture. As well, the definitions 44 can include hyperlinks and cross-references. Other types of definitions, layouts, and formats for the glossary are possible. At a minimum, the glossary 40 should include terms 43 and definitions 44. However, in one embodiment, the definition field can be blank.

The glossaries help tagging systems and users distinguish between tags subjectively created by different users. For example, first and second items are both marked with the tag "java." However, alone, the term "java" is ambiguous and can refer to a programming language, an island in Indonesia, or coffee. Without further information, the tagging system or user is unable to distinguish which meaning of the word was intended by the user. The glossary for java, the programming language, can include terms, such as "garbage collection," "generics," "classes," and "applet." Meanwhile, the glossary for java, the island, can include terms, such as "Jakarta," "Mount Merapi," and "Bengawan Solo River," while the glossary for java, the coffee, can include the terms "green coffee," "robusta," "Arabica," and "coffee house." By reviewing the glossary, the tagging system or user can better understand the context surrounding the tag.

Glossary Uses

Figure 4:
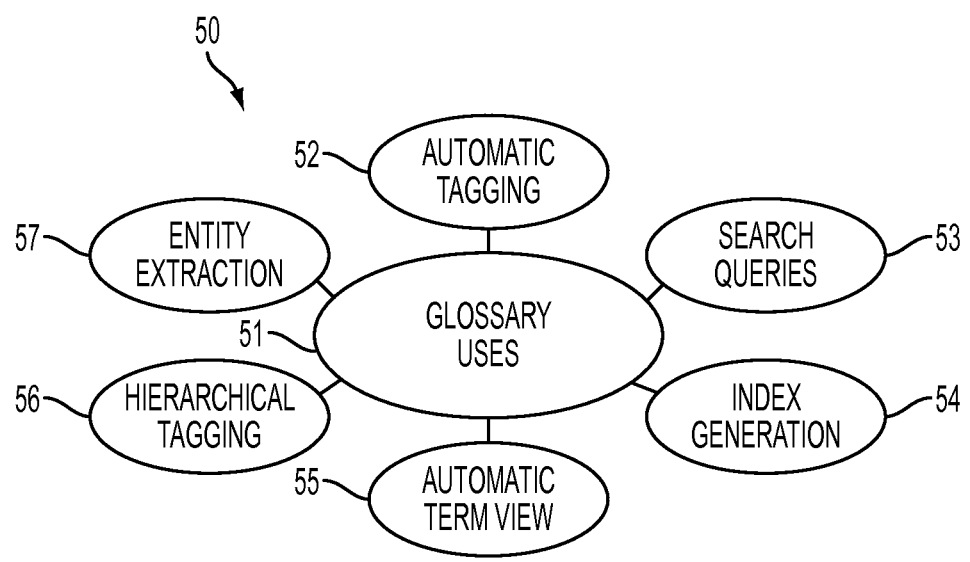
FIG. 4 is a data flow diagram showing uses for tag glossaries.

The glossary-enhanced tags can be used to tag further documents and provide additional information regarding the documents. FIG. 4 is a data flow diagram showing uses for tag glossaries. The tag glossaries can be used 51 for automatic tagging 52, augmenting search queries 53, generating indices 54, automatic term view 55, hierarchical tagging 56, and entity extraction 57. For automatic tagging 52, the terms of an untagged document can be compared with one or more glossaries associated with tagged documents. Subsequently, the tag or tags associated with the glossary having a closest or highest similarity is assigned to the untagged document. Automatic tagging is further discussed below in detail with reference to FIG. 5. Search query augmentation 53 utilizes the glossaries to supplement a search query by adding additional terms or aliases from the glossaries or qualifying the search results using the glossary terms and aliases. Augmenting search queries is further discussed below in detail with reference to FIG. 6. Indices for the documents can also be generated 54 using the tag glossaries to provide users with a directory of topics located within a particular tagged document. Generating indices is further discussed below in detail with reference to FIG. 7.

Additionally, glossaries can be used to provide an automatic view 55 of the terms and definitions in the glossary during an occurrence of one of the terms in the associated document. The automatic term view 55 assists users that are unfamiliar with the text or terms of the document. The term, definition, or alias can be displayed in a pop-up message, text box, or highlighted menu option. Other displays of the data are possible. The automatic term view can be applied to each occurrence of the term or alias of the term, or only for the first occurrences. In a further embodiment, the automatic term view is only provided for uncommon or frequently misunderstood terms.

In hierarchical tagging 56, the terms in a glossary can be used as subtopics for the tag to which the glossary belongs. Each subtopic is associated with a subtag, which is in turn associated with a subglossary. Specifically, in hierarchical tagging, one tag represents a category, which includes one or more other tags. The other tags can also represent other categories, which include further tags. In turn, the further tags can also represent other categories and so on. A category represented by a tag can be identified by adding a link in the glossary entry for that tag, to another glossary, which includes the terms of that category. In a further embodiment, the glossary entry for the tag can include links to two or more other terms in the same glossary, where the other terms are associated with the category represented by the first term.

Entity extraction 57 involves using the terms of the glossary as extra "entities" to identify in documents associated with the tag that corresponds to the glossary. During entity extraction, regular expressions of text are matched to identify references to people, companies, places, and dates, as well as other entities. Generally, the references are textually ambiguous and may have multiple expressions, which can make properly forming correct regular expressions difficult. However, by including terms in a glossary associated with the document as entities, entity extraction can be conducted by looking for the terms and their aliases in the glossary, as defined by the entry for the term, instead of having to resolve ambiguous regular expressions. Thus, given a glossary entry for a place "University of Washington," the aliases can include "UW" and "Udub." All references to the institution can be identified using the three references.

Automatic Tagging

Figure 5:
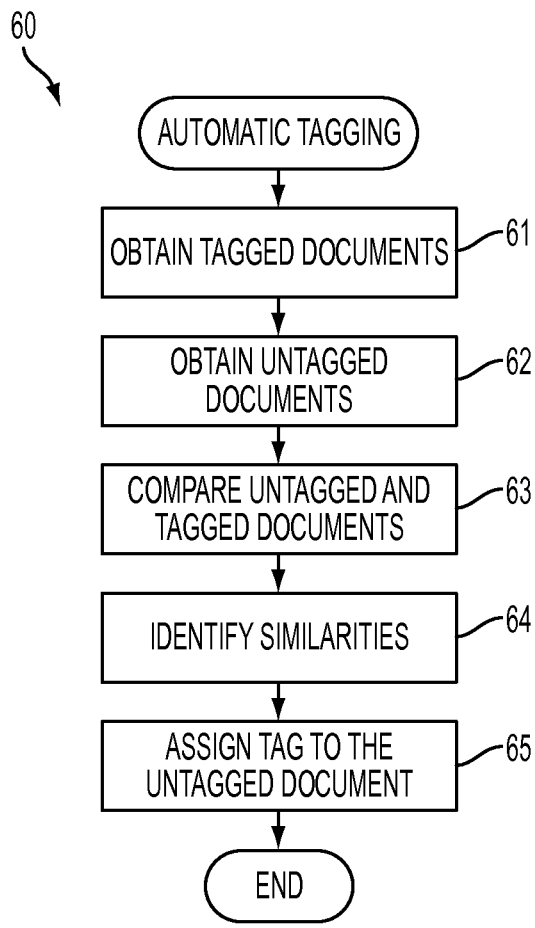
FIG. 5 is a flow diagram showing, by way of example, a method for automatically assigning tags to documents.

Automatically tagging documents can be extremely difficult using conventional tagging systems since tags can be general and ambiguous and the tagging systems are unable to distinguish between the meanings of tags. Glossaries of terms associated with the tag can be used to distinguish the meanings between tags and further assign a tag to an untagged item. FIG. 5 is a flow diagram showing, by way of example, a method for automatically assigning content tags to documents. A set of tagged documents is obtained (block 61) and at least one untagged document is also obtained (block 62). Each of the tagged documents are associated with one or more glossaries, each having terms, definitions, and aliases. The untagged document is compared (block 63) with the glossaries of the tagged documents and a similarity measure between the untagged document and each glossary is determined (block 64).

The similarity measures can be calculated using cosine similarity. A vector is determined for each of the tagged documents by identifying the terms in the corresponding glossaries and assigning a weight to each of the terms. The vector for the untagged document is determined by identifying terms in the document and assigning a weight to each of the terms. Once determined, the vectors of the untagged document and the glossaries associated with the tagged documents are compared to determine the similarity measure. The tag associated with the glossary having the highest similarity is assigned to the untagged document (block 65). The higher the similarity measure, the higher the likelihood that the tag associated with the tagged document should be assigned to the untagged document. One or more tags can be assigned to a single document.

In a further embodiment, a predetermined threshold is applied to the similarity measures. The tag associated with the tagged document having the highest similarity measure, which satisfies the threshold, is selected and assigned to the untagged document.

In yet a further embodiment, similarity can be determined by identifying common terms. For example, an untagged document and tagged document are compared. More specifically, the terms in the untagged document and the glossary terms of the tagged document are compared to identify those terms in common. The tags of the documents having the most terms in common are assigned to the untagged document. A predetermined threshold of terms-in-common can also be applied. For instance, in the example above, a predetermined threshold of 12 terms-in-common is set. If one of the tagged documents has 12 or more terms-in-common with the untagged document, then the tag of that tagged document is assigned. Alternatively, if the predetermined threshold is not satisfied, no tag is assigned to the untagged document. Other methods for determining similarity and threshold values are possible, such as percentages and absolute numbers. Additionally, the predetermined threshold can be based on factors, such as document size, subject matter, and type of document, as well as other factors.

Query Augmentation

Often times, document searches are limited based on the query provided. For example, a search for "apple" may provide results for both of or one of Apple products, licensed by Apple Inc., Cupertino, Calif., or apple, the fruit. Glossaries can provide contextual information, such as terms, definitions, and aliases to supplement the search query. In the above example, adding terms from glossaries associated with the different "apple" tags provides a context for each of the different searches. Additionally, a search for documents containing a specific term is generally limited to the term as indicated in the search query. For example, if the search query includes the phrase "University of Washington," documents with occurrences of other related terms, or aliases, that are commonly used to refer to the University of Washington may be missed, such as "UW," "Udub," or "Huskies."

Figure 6:
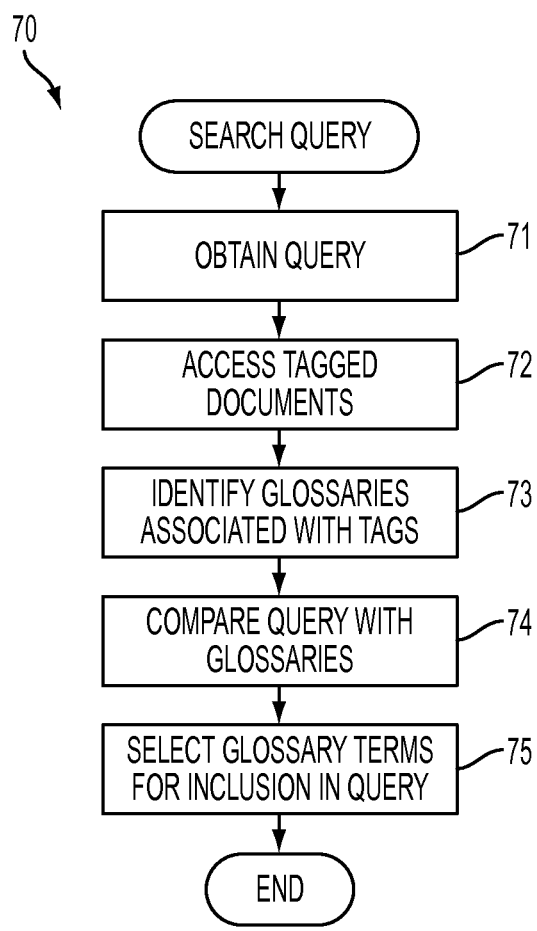
FIG. 6 is a flow diagram showing, by way of example, a method for supplementing a search query with information from tag glossaries.

As described above, query augmentation can be used to obtain focused and directed search results. FIG. 6 is a flow diagram showing, by way of example, a method for supplementing a search query with information from a tag glossary. A query is obtained or received (block 71) and tagged documents are accessed (block 72). The query can be obtained from a user, a search engine, or a database, as well as another repository. The tagged documents can be accessed from a database, file, or other repository, and can include documents recently tagged, such as automatically or by a user. Recently tagged documents can include those that satisfy a particular time threshold, such as being tagged within a particular period of time. As well, the tagged documents can be associated with a particular user, such as the user that entered the query. Glossaries associated with the tagged documents are identified (block 73) and the query is compared to the glossaries (block 74). Subsequently, one or more glossary terms or aliases are selected for inclusion in the query (block 75). The glossary terms and aliases can be selected based on a relatedness or similarity to the search query.

Specifically, the terms or aliases for inclusion in the query can be selected by locating entries in the glossary that include one or more of the words in the query, such as a term, definition, or alias. Subsequently, the terms, definitions, and aliases of those entries can be used to expand the query. For example, if the query includes the term "UW," one or more associated aliases, such as "University of Washington," "Udub," and "Huskies" may be provided for inclusion in the query. Further, all the glossaries associated with a user submitting the search query can be identified and glossary entries for which a term or alias appears in the query string are identified. Aliases for the terms or other aliases and terms for the alias can then be added to the query string. In a further embodiment, all the glossaries associated with a particular document, such as a document being read by the user, are searched for glossary entries to augment a query. Also, synonyms of each search term can be identified and used to augment the query. For example, a search term is selected from the query and looked up in a thesaurus to determine other similar terms, which are added to the query.

In yet a further embodiment, each search term can be looked up in a thesaurus to determine other similar or related terms for the search term and subsequently, the search term and similar terms can be compared with the glossaries to identify terms, definitions, or aliases for adding to the search query.

In yet an even further embodiment, glossary terms and aliases can be selected using term frequency-inverse document frequency ("tf-idf"), which generally assumes that the frequency or popularity of a term models the importance of that term. For example, the importance of a term increases the more times the term is identified in a document. A set of glossaries associated with the user is identified and a dual-weighted score is constructed for each term or alias in the glossary. First, a standard cosine similarity measure between the query and each glossary entry, including the terms and aliases, is determined, as described above. Next, a tf-idf value is determined for each glossary against all documents tagged with tags from any of the glossaries to select the most selective terms in each glossary. A product of the cosine similarity score and the tf-idf score are used to select the N most significant glossary terms to add to the query.

In still a further embodiment, search results are identified using only the search query and the glossaries are subsequently used to refine the results by selecting one or more of the results that are most closely related to the glossaries associated with the tagged documents as recently used tags. Specifically, a query is provided and applied to a corpus of documents. One or more of the documents are identified as search results based on a relationship with or a similarity to the query. The similarity can be based on satisfying a predetermined number of search terms in the query or by determining cosine similarity between the search query and the documents. Other measures of similarity are possible. One or more tagged documents related to the query are obtained. The search results are compared with the glossaries associated with the tagged documents. Those search results that are the closest related, or most similar, to the glossaries are selected for providing to a user as relevant results.

Index Generation

Indices are collections of relevant topics and provide a topical context for a document, such as a book or research paper, and are generally located at the back of a document. An index includes words or terms, known as headers, and pointers for the headers. The pointers identify the location of information relating to the header in a document. Indices allow a user to quickly obtain an overview of topics included in a document, as well as to identify sections of the document relevant to particular topics. Also, indices can be used for directing users to a particular index term, or topic, within the document. However, manually generating indices can be difficult and expensive. As well, automatically generated indexes can be complex to build.

Figure 7:
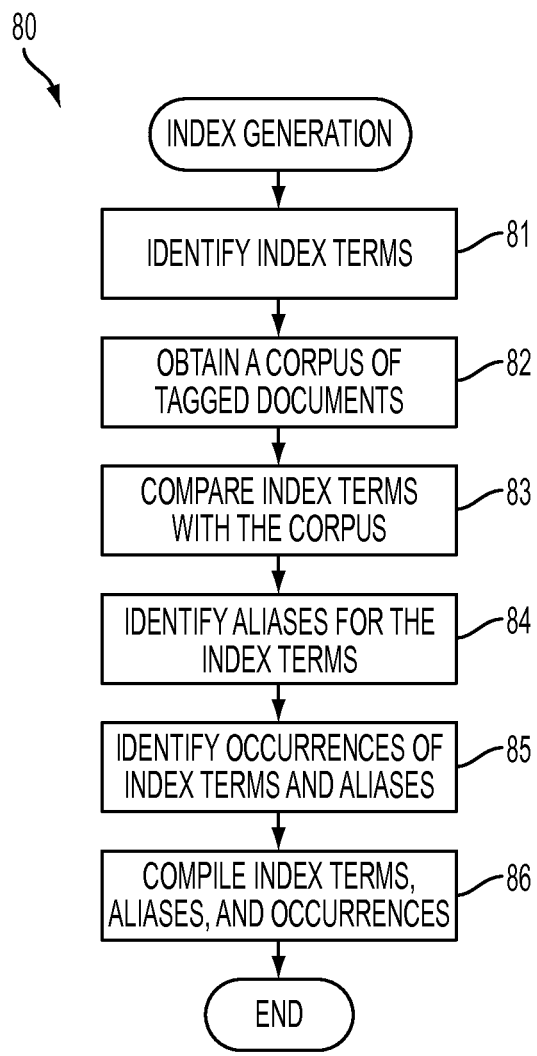
FIG. 7 is a flow diagram showing, by way of example, a method for generating an index using tag glossaries.

FIG. 7 is a flow diagram showing, by way of example, a method for generating an index using a tag glossary. Index terms are identified (block 81) from a document for which the index will be generated. A corpus of tagged documents related to the document to be indexed is obtained (block 82) and each tagged document is associated with at least one tag. The tagged documents can be obtained from a database, file, or other repository based on a similarity or relevance measure. Each tag is associated with a glossary, which includes terms, term definitions, and aliases. The index terms are then compared with the glossaries of the tags attached to documents in the corpus (block 83). During the comparison (block 83), aliases are identified (block 84) in the glossaries for one or more of the index terms. Subsequently, occurrences of the index terms and aliases are identified (block 85) in the document. The index term and alias occurrences can be identified using a finite state toolkit ("FST"), which identifies patterns within the document using the glossaries, such as described in Karttunen, L., Pattern Matching with FST—a tutorial. PARC Technical Report 2010-1. 2010 Nov. 29. Finally, the index terms, aliases, and occurrences are compiled into the index (block 86), which is incorporated into the document.

FST allows a user to create networks from text files and regular expressions, as well as apply the networks to input strings or files. Each glossary term and associated alias, if any, can form a pattern. The patterns are compiled into a finite state machine, which is run over the text of each document. Terms in the documents that match one or more of the patterns are selected as results. Page numbers for each occurrence of the resulting terms in the document are identified and organized to generate the index.

In a further embodiment, the index can be generated for a tagged document using the assigned tags as index terms. Once identified, regular expression machinery, such as FST, is applied to find all expressions of the index terms in the document. The terms and locations of the term expressions are then compiled into an index for the document.

Once generated, the index can be displayed with terms and a representation of the locations of that term in the associated document. For example, the location representation can include page number, page thumbnails, and page strips. Page strips are representative of the pages in a document and include a visual display of term occurrences. The length of the page strip corresponds with the number of pages in a document. The term occurrences are indicated in the page strip by location in the document using graphs, colors, bars, or lines. Selecting a location on the page strip opens the document to the corresponding page.

In a further embodiment, two or more tagged documents can be compared for similarity based on the glossaries associated with the tags assigned to the tagged documents. The similarity can be based on a number of common terms in the glossaries or based on a cosine similarity between the text of the glossaries associated with the tags.

In yet a further embodiment, the glossaries provide for better natural language processing by providing contextual information about a tag and associated document. The natural language processing can include distinctions, anaphora resolution, and date resolution, as well as other types of language processing.

While the invention has been particularly shown and described as referenced to the embodiments thereof, those skilled in the art will understand that the foregoing and other changes in form and detail may be made therein without departing from the spirit and scope of the invention.

What is claimed is:

1. A method for associating glossaries with tags, comprising:
maintaining a set of tags, each tag in the set assigned to one or more documents;
maintaining a plurality of glossaries, wherein each glossary is associated with one or more of the tags in the set and comprises a collection of terms related to the associated one or more tags, aliases for the terms, and definitions for the terms;
assigning a new tag to an untagged document;
comparing the new tag with the set of tags;
selecting from the plurality of glossaries, one such glossary associated with a tag from the set of tags that matches the new tag;
generating a new glossary, and using the selected glossary as a template for the new glossary by inheriting the terms, aliases, and definitions from the selected glossary into the new glossary;
adding one or more terms, definitions, and aliases to the new glossary; and
assigning the new glossary as a glossary associated with the newly tagged document.

2. A method according to claim 1, further comprising at least one of:
adding one or more additional terms to the glossary associated with the newly tagged document;
modifying at least one of the terms in the glossary associated with the newly tagged document; and
removing at least one of the terms in the glossary associated with the newly tagged document.

3. A method according to claim 2, further comprising:
automatically searching for potential definitions for the additional terms; and
selecting at least one of the potential definitions for at least one of the additional terms.

4. A method according to claim 2, further comprising:
automatically searching for potential definitions for the additional terms; and
presenting to a user, a list of the potential definitions for at least one of the additional terms for selection and inclusion in the glossary associated with the newly tagged document.

5. A method according to claim 1, further comprising:
compiling aliases for one or more terms in the glossary associated with the newly tagged document, wherein each alias comprises an alternative reference for one of the terms.

6. A method according to claim 5, further comprising:
displaying the terms, definitions, and aliases in the glossary associated with the newly tagged document during an occurrence of one of the terms in the untagged document.

7. A method according to claim 6, wherein the terms, definitions, and aliases are displayed in one of a pop-up message, text box, and menu option.

8. A method according to claim 1, further comprising:
generating an index for the newly tagged document, comprising:
identifying index terms from the untagged document;
identifying aliases for one or more of the index terms; and
determining occurrences for the index terms and aliases in the newly tagged document.

9. A method according to claim 1, further comprising:
identifying one of the tagged documents most similar to the newly tagged document; and
using the glossary associated with the most similar document as a template for a further glossary associated with the newly tagged document.

10. A non-transitory computer readable storage medium storing code for executing on a computer system to perform the method according to claim 1.

11. A system for associating glossaries with tags, comprising:
a set of tags, each tag in the set assigned to one or more documents;
a plurality of glossaries, wherein each glossary is associated with one or more of the tags in the set and comprises a collection of terms related to the associated one or more tags, aliases for the terms, and definitions for the terms; and
a hardware processor to execute modules, comprising:
a tag assignment module to assign a new tag to an untagged document;
a tag comparison module to compare the new tag with the set of tags;
a glossary selection module to select from the plurality of glossaries, one such glossary associated with a tag from the set of tags that matches the new tag;
a glossary generating module to generate a new glossary and to use the selected glossary as a template for the new glossary by inheriting the terms, aliases, and definitions from the selected glossary into the new glossary;
an entry module to add one or more terms, definitions, and aliases to the new glossary; and
a glossary assignment module to associate the glossary of the matching tag with the newly tagged document.

12. A system according to claim 11, further comprising at least one of:
a term addition module to add one or more additional terms to the glossary associated with the newly tagged document;
a term modification module to modify at least one of the terms in the glossary associated with the newly tagged document; and
a term removal module to remove at least one of the terms in the glossary associated with the newly tagged document.

13. A system according to claim 12, further comprising:
a search module to automatically search for potential definitions for the additional terms; and
a selection module to select at least one of the potential definitions for at least one of the additional terms.

14. A system according to claim 12, further comprising:
a search module to automatically search for potential definitions for the additional terms; and
a presentation module to present to a user, a list of the potential definitions for at least one of the additional terms for selection and inclusion in the glossary associated with the newly tagged document.

15. A system according to claim 11, further comprising:
a compiler to compile aliases for one or more terms in the glossary associated with the newly tagged document, wherein each alias comprises an alternative reference for one of the terms.

16. A system according to claim 15, further comprising:
a display to display the terms, definitions, and aliases in the glossary associated with the newly tagged document during an occurrence of one of the terms in the untagged document.

17. A system according to claim 16, wherein the terms, definitions, and aliases are displayed in one of a pop-up message, text box, and menu option.

18. A system according to claim 11, further comprising:
an index generator to generate an index for the newly tagged document, comprising:
an identification module to identify index terms from the untagged document and to identify aliases for one or more of the index terms; and
an occurrence module to determine occurrences for the index terms and aliases in the newly tagged document.

19. A system according to claim 11, further comprising:
a similarity module to identify one of the tagged documents most similar to the newly tagged document and to use the glossary associated with the most similar document as a template for a further glossary associated with the newly tagged document.

\* \* \* \* \*